(12) United States Patent
Bennemann et al.

(10) Patent No.: US 11,827,124 B2
(45) Date of Patent: Nov. 28, 2023

(54) VEHICLE SEAT AND METHOD FOR ADAPTING A VEHICLE SEAT TO A VEHICLE OCCUPANT

(71) Applicant: Volkswagen Aktiengesellschaft, Wolfsburg (DE)

(72) Inventors: Mark Bennemann, Falkensee (DE); Malte Lutz, Braunschweig (DE); Cedric Heise, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 17/700,183

(22) Filed: Mar. 21, 2022

(65) Prior Publication Data
US 2022/0297576 A1  Sep. 22, 2022

(30) Foreign Application Priority Data

Mar. 22, 2021  (DE) .......................... 102021202765.2

(51) Int. Cl.
*B60N 2/02* (2006.01)
(52) U.S. Cl.
CPC ....... *B60N 2/0244* (2013.01); *B60N 2/02246* (2023.08); *B60N 2/0268* (2023.08)
(58) Field of Classification Search
CPC .. B60N 2/0244; B60N 2/0224; B60N 2/0232; B60N 2/0252; B60N 2/34; B60N 2/02; B60N 2/90; B60N 2/002; B60N 2002/0268; B60N 2002/026
USPC ....................................... 297/217.2
See application file for complete search history.

(56) References Cited

U.S. PATENT DOCUMENTS

| | | | | |
|---|---|---|---|---|
| 2006/0253241 | A1* | 11/2006 | Bothe | B60N 2/002 701/49 |
| 2009/0243347 | A1* | 10/2009 | Wilms | B60N 2/0252 297/61 |
| 2018/0118054 | A1* | 5/2018 | Devilbiss | B60N 2/914 |
| 2021/0221258 | A1* | 7/2021 | Ekchian | B60N 2/767 |

FOREIGN PATENT DOCUMENTS

| | | |
|---|---|---|
| DE | 102017205135 A1 | 9/2018 |
| DE | 102018208625 A1 | 12/2019 |

\* cited by examiner

*Primary Examiner* — Mark R Wendell
(74) *Attorney, Agent, or Firm* — Peter Zura; LOZA & LOZA, LLP

(57) ABSTRACT

A vehicle seat, including a plurality of actuators that can be activated independently of one another and that are arranged in a matrix-like manner, at least one sensor system for detecting an object on the vehicle seat, and at least one control unit for activating the actuators. The control unit may be configured to activate the actuators as a function of a detected contour of the object, so that the contour of the vehicle seat adapts to the contour of the object, and to a method for adapting a vehicle seat to a vehicle occupant.

20 Claims, 3 Drawing Sheets

VEHICLE SEAT AND METHOD FOR ADAPTING A VEHICLE SEAT TO A VEHICLE OCCUPANT

RELATED APPLICATIONS

The present application claims priority to German Patent App. No. 10 2021 202 765.2, to Bennemann, et al., filed on Mar. 22, 2021, the contents of which is incorporated by reference in its entirety herein.

TECHNICAL FIELD

The present disclosure relates to a vehicle seat and to a method for adapting a vehicle seat to a vehicle occupant.

BACKGROUND

A control system in a vehicle seat for activating at least one comfort function of the vehicle comprising at least one control unit, which activates at least one device providing the comfort function, is known from DE 10 2017 205 135 A1. The control system furthermore comprises at least one detection unit, which is connected to the control unit, wherein the detection unit detects an orientation of at least part of a vehicle seat in a passenger compartment and transmits this to the control unit. The control unit then controls the comfort function as a function of the detected vehicle orientation. For example, the vehicle orientation is a back rest orientation, which is preferably determined by way of a back rest inclination angle, and/or a seat surface orientation, which is preferably determined by way of a vehicle seat torsion angle about a vehicle seat vertical axis. The vehicle seat furthermore comprises at least one seat contour element adjusting the vehicle seat contour.

A contour adaptation device for a vehicle is known from DE 10 2018 208 625 A1, including a volume situated within a gas-impermeable envelope, wherein at least a section of the envelope comprises a three-dimensional shapeable contact region for bearing against an object, and a mixture of at least one solid granulate and at least one gas is present in the volume. In a release state of the contour adaptation device, in which the contact region can be placed against one or more sides of the object, an ambient pressure is present in the volume, and in a holding state of the contour adaptation device, in which the geometry of the contact region caused by bearing against the object is fixed, a negative pressure is present in the volume. Furthermore, a gas regulating unit is provided, by means of which the contour adaptation device can be transferred from the release state into the holding state, and vice versa, wherein the gas regulating unit is connected to the volume in a gas-conducting manner and comprises a piston.

SUMMARY

The technical problem underlying the present disclosure is that of further improving a vehicle seat in terms of comfort and safety and to provide a corresponding method for activating such a vehicle seat.

The technical problem is solved by a vehicle seat and related method having the features recited in the independent claims. Further advantageous embodiments will be apparent from the dependent claims.

For this purpose, the vehicle seat may include a plurality of actuators that can be activated independently of one another and are arranged in a matrix-like manner, at least one sensor system for detecting an object on the vehicle seat, and at least one control unit for activating the actuators. The control unit is designed to activate the actuators as a function of a detected contour of the object, so that the contour of the vehicle seat adapts to the contour of the object. Adapting does not necessarily mean a complete, close-contact adaptation of the vehicle seat contour to the object; rather, defined regions around at least individual sections of the object may be omitted so as to preserve freedom of movement. Arranged in a matrix-like manner does not preclude that no actuators are present in individual locations, or that the distances between the actuators vary in individual locations. It is also possible for the actuator surface to vary, depending on the position. As a result of the plurality of actuators, the vehicle seat can adapt considerably better to the needs of the vehicle occupant in certain situations, which will be described in greater detail below. The actuators can preferably be moved in a linear manner In another embodiment, the actuators are designed in such a way that the rigidity thereof can be set. However, it can also be provided that individual actuators have a higher inherent rigidity than other actuators.

In another embodiment, the vehicle seat is designed in such a way that it has a reclined position. This is in particular very advantageous in the case of motor vehicles driving in an automated manner. In the reclined position, the vehicle seat resembles a plane, so that the positions of the actuators can be described as X/Y coordinates, the Z coordinate of which can be varied by the activation of the actuators. In particular in the reclined position, the vehicle seat can then adapt optimally to a sleeping position of the vehicle occupant, and can accommodate the vehicle occupant corresponding to an optimally adapted cavity. For example, a rolling motion of the vehicle occupant can thus be prevented or limited. Furthermore, this adaptation conveys a sense of security.

In another embodiment, the sensor system for detecting an object is designed in the form of spatially distributed sensors in the vehicle seat and/or in the form of a passenger compartment monitoring sensor system of the vehicle. The sensors in the vehicle seat are designed, for example, as capacitive proximity sensors, pressure sensors and/or force sensors. The sensors can be arranged at the actuators or, for example, in the vicinity of the actuators. The passenger compartment monitoring sensor system is, for example, designed as at least one imaging sensor system, such as for example LIDAR and/or a camera. Preferably, both sensor systems are employed. Using the images of a passenger compartment monitoring sensor system, it is possible, in particular, to better analyze the sleeping position, while the sensors in the vehicle seat are able to better ascertain the specifically occurring forces and/or anatomic conditions (tall, short, big, thin).

Using the described sensor systems, it is also possible to carry out an object recognition (people, suitcase or animal), wherein imaging sensors may be used. Using the sensor systems, it is possible to detect a change in the sleeping position, and tracking of the actuators can take place accordingly.

In another embodiment, the actuators are distributed across the entire area of the vehicle seat, so that the vehicle occupant can be embedded from head to toe.

In another embodiment, the control unit may be configured to estimate accelerations that occur using data of at least one driver assistance system, and to activate the actuators in an anticipatory manner. It is possible, for example, to determine an upcoming negotiation of a curve or an uneven road and to activate the actuators accordingly at an early stage based on the data of a navigation control device, so as to counteract undesirable movements of the vehicle occupant in a defined manner. Likewise, it is possible to infer an impending accident from the data of a restraint system (such as, e.g., an airbag control device or other alternative restraint systems), so that the actuators are then activated so as to absorb or dissipate the occurring forces.

In another embodiment, the control unit is designed to take user specifications into consideration during the activation of the actuators.

For example, the user can specify medical data so that, for example, the activation of the actuators takes existing back problems or the like into consideration. The data can, for example, be transmitted from a mobile terminal or be read out from a memory. As an alternative, the data can be provided by C2X communication. As an alternative or in addition, the user can select a vehicle mode (e.g., Sport, Eco or Relax), wherein the activation of the actuators is then accordingly adapted to the vehicle mode.

In another embodiment, the actuators are designed as electrical actuators, which can be activated particularly well and easily. In principle, however, pneumatic or hydraulic actuators are also possible.

The vehicle seat can be provided with a closed, flexible surface, beneath which the actuators are arranged. The sensors can be at least partially or completely incorporated into the surface fabric (smart textile).

With respect to the design of the present disclosure in terms of the method, the content of the preceding embodiments is incorporated by reference in its entirety.

BRIEF DESCRIPTION OF THE DRAWINGS

The present disclosure will be described in more detail hereafter based on a preferred exemplary embodiment. In the drawings.

DETAILED DESCRIPTION

Figure 1:
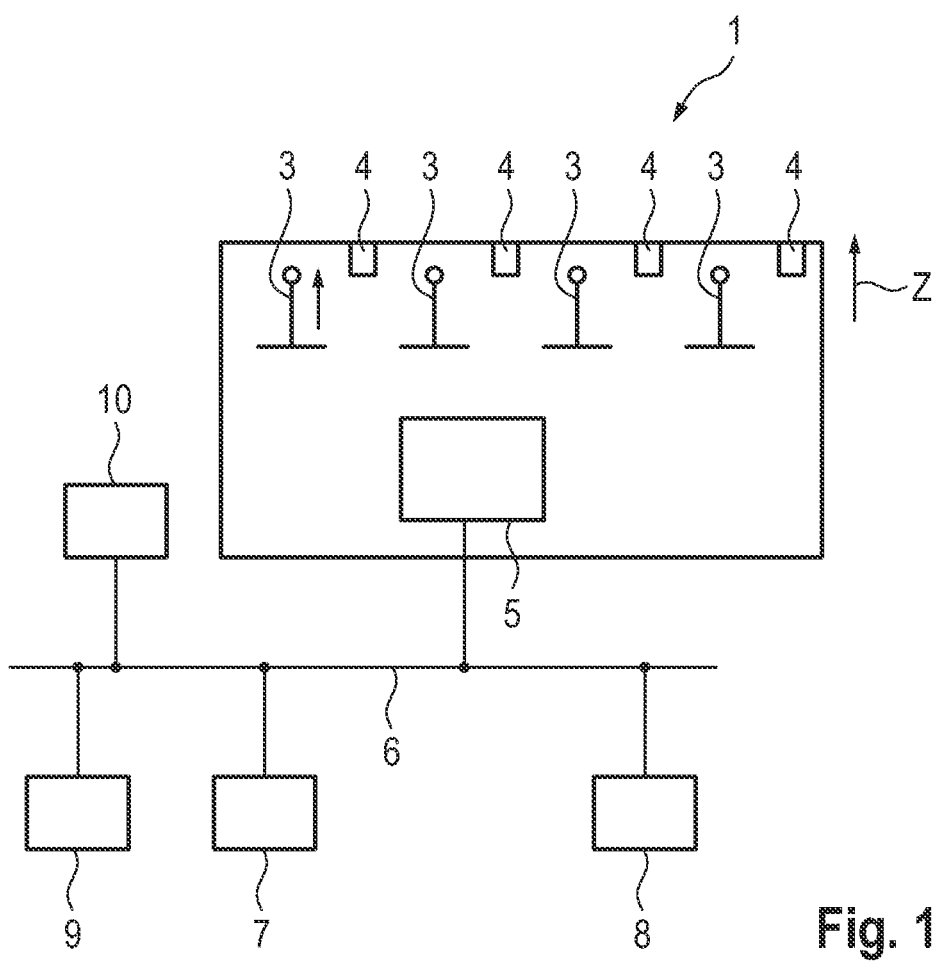
FIG. 1 shows a schematic block diagram of a vehicle seat according to some aspects of the present disclosure.

FIG. 1 schematically shows a vehicle seat 1. The vehicle seat 1 is schematically shown in a side view in a reclined position. The vehicle seat 1 has a closed, flexible surface 2 beneath which a plurality of actuators 3 are arranged. The actuators 3 are arranged in a matrix-like manner, wherein FIG. 1 only shows one row of actuators 3 for the sake of clarity. The actuators 3 can be activated independently of one another and can be displaced in the Z direction. However, embodiments in which the actuators can be displaced in the X, Y and Z directions are also conceivable. The vehicle seat 1 furthermore comprises a plurality of sensors 4, which are designed as pressure sensors and which are likewise arranged in a matrix-like manner Finally, the vehicle seat 1 also comprises a control unit 5, which activates the actuators 3. The control unit 5 can also be arranged outside the actual vehicle seat 1. The control unit 5 is connected via a bus system 6 to a navigation control device 7, an airbag control device 8, an input unit 9 and a camera 10, wherein the camera 10 is an integral part of a vehicle occupant monitoring system. The vehicle seat position and setting are detected by way of the data of the camera 10 or another sensor system that is not shown. It is furthermore possible to detect, by means of the camera 10, whether a vehicle occupant or an inanimate object is present on the vehicle seat 1.

The actuators 3 are preferably electrical actuators 3 and distributed across the entire surface of the vehicle seat 1. The position of a vehicle occupant is detected by way of the sensors 4 and the camera 10, and the actuators 3 are activated in such a way that the contour of the vehicle seat 1 adapts to the contour of the vehicle occupant. The control unit 5 additionally receives data from the navigation control device 7 and/or the airbag control device 8 via the bus system 6. In addition, the vehicle occupant can provide user-specific inputs via the input unit 9, which are taken into consideration during the vehicle seat contour adaptation.

Figure 2A:
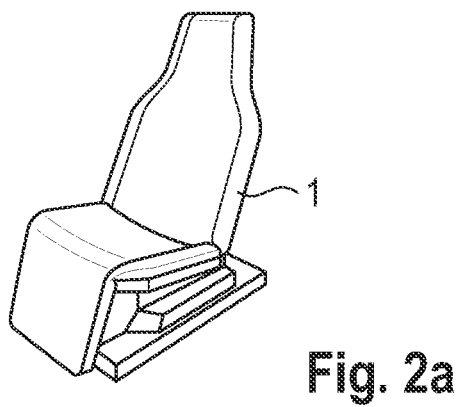
FIGS. 2a-2c show various vehicle seat positions according to some aspects of the present disclosure.
Figure 2B:
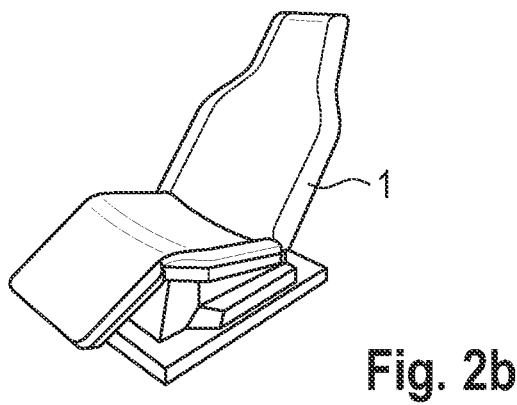
Figure 2C:
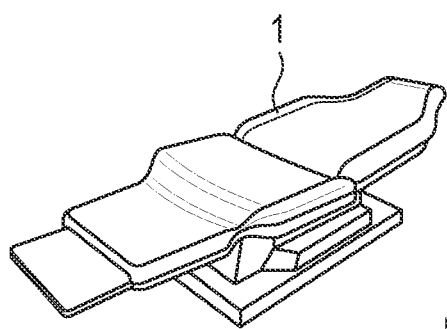

FIG. 2a shows a vehicle seat in an active position. FIG. 2b shows a relax position, and FIG. 2c shows a reclined position, wherein the vehicle seat 1 can also be rotated 180°, that is, counter to the driving direction.

Figure 3A:
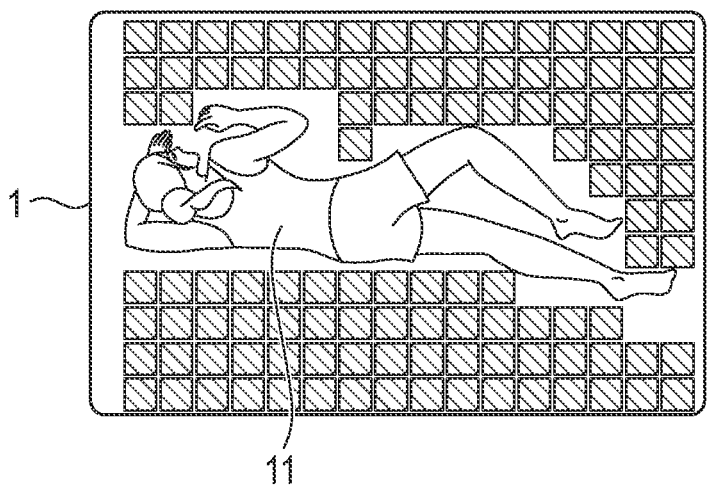
FIGS. 3a-3c show a schematic representation of various actuator settings in a reclined position of the vehicle seat including a sleeping vehicle occupant according to some aspects of the present disclosure.

Based on FIGS. 3a-3c, a preferred application of the vehicle seat 1 shall now be described. A sleeping vehicle occupant 11 is illustrated in FIG. 3a. The position of the vehicle occupant 11 is detected by the sensors 4 and/or the camera 10, and the actuators 3 around the vehicle occupant 11 are activated so that the actuators 3 move upwardly, which is symbolized by hatching. The vehicle occupant 11 is thereby embedded from head to toe. As a result of the upwardly moved actuators 3, the vehicle seat contour expands around the vehicle occupant 11.

Figure 3B:
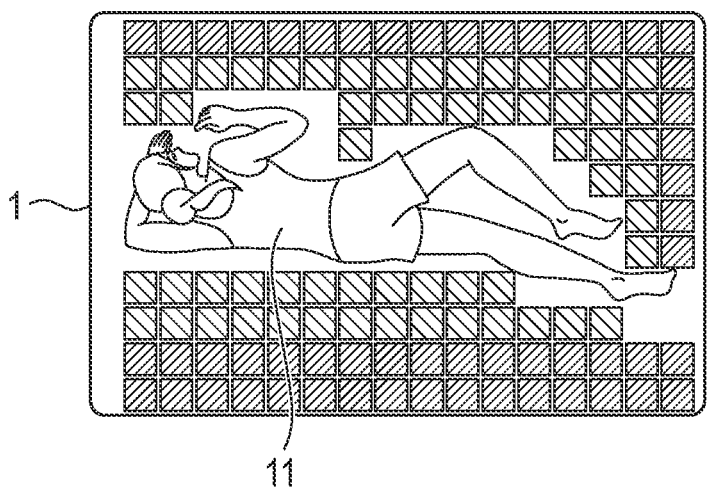

When the control unit 5, based on the data of the navigation control device 7, now detects an upcoming negotiation of a curve, the control unit 5 can move the outer actuators 3 further upwardly and/or increase the rigidity thereof so that the risk of rolling away is reduced or prevented, which is shown in FIG. 3b. The higher and/or more rigid outer actuators 3, or the sections of the surface 2 assigned thereto, are shown with different hatching.

Figure 3C:
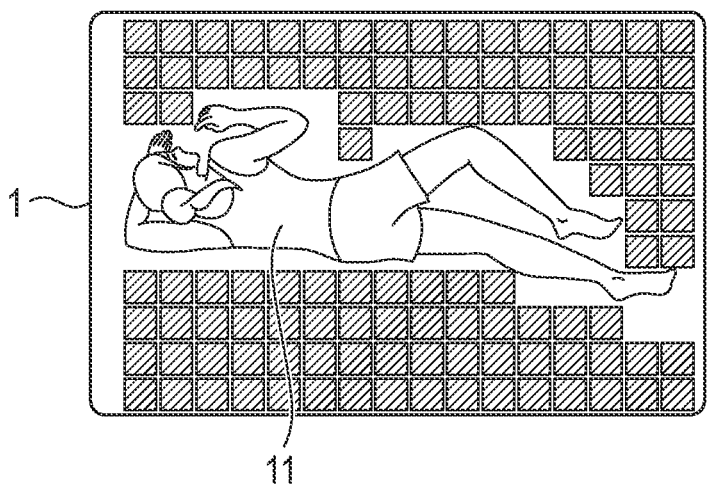

When the airbag control device 8 now detects that a crash is imminent, all actuators 3 around the vehicle occupant 11 are raised and/or made more rigid, which is shown in FIG. 3c. It may be also provided that individual regions, such as for example the region around the collarbones, are set to be slightly softer so as to reduce the risk of injury.

LIST OF REFERENCE SIGNS 1 vehicle seat
2 surface
3 actuator
4 sensor
5 control unit
6 bus system
7 navigation control device
8 airbag control device
9 input unit
10 camera
11 vehicle occupant

The invention claimed is:

1. A vehicle seat, comprising:
   a plurality of actuators configured at least partially in a matrix formation and further configured to be activated independently of one another;
   at least one sensor system for detecting an object on the vehicle seat; and at least one control unit for activating the actuators, wherein the control unit is configured to activate the actuators as a function of a detected contour of the object so that the contour of the vehicle seat adapts to the detected contour of the object, and wherein the at least one control unit is further configured to activate some of the plurality of actuators to increase the rigidity of the vehicle seat in an area outside the contour to embed the object to the vehicle seat.

2. The vehicle seat according to claim 1, wherein the actuators are configured to set a rigidity of the vehicle seat.

3. The vehicle seat according to claim 1, wherein the vehicle seat is configured to include a reclined position.

4. The vehicle seat according to claim 1, wherein the sensor system for detecting an object is configured as (i) spatially distributed sensors in the vehicle seat and/or (ii) a passenger compartment monitoring sensor system of the vehicle.

5. The vehicle seat according to claim 1, wherein the actuators are distributed across an entire surface of the vehicle seat.

6. The vehicle seat according to claim 1, wherein the control unit is configured to estimate accelerations that occur using data of at least one driver assistance system, and to activate the actuators in an anticipatory manner in response thereto.

7. The vehicle seat according to claim 1, wherein the control unit is configured to receive user specifications for the activating of the actuators.

8. The vehicle seat according to claim 1, wherein the actuators comprise electrical actuators.

9. A method for a vehicle seat, comprising:
configuring a plurality of actuators at least partially in a matrix formation and further configuring the plurality of actuators to be activated independently of one another;
detecting an object on the vehicle seat via at least one sensor system; and
activating the actuators via at least one control unit, wherein the activating comprises a function of a detected contour of the object so that the contour of the vehicle seat adapts to the detected contour of the object; and
activating, via the at least one control unit, some of the plurality of actuators to increase the rigidity of the vehicle seat in an area outside the contour to embed the object to the vehicle seat.

10. The method according to claim 9, further comprising setting a rigidity of the vehicle seat via the actuators.

11. The method according to claim 9, wherein the vehicle seat is configured to include a reclined position.

12. The method according to claim 9, wherein the at least one sensor system for detecting an object is configured as (i) spatially distributed sensors in the vehicle seat and/or (ii) a passenger compartment monitoring sensor system of the vehicle.

13. The method according to claim 9, wherein configuring the plurality of actuators comprises distributing the plurality of actuators across an entire surface of the vehicle seat.

14. The method according to claim 9, further comprising estimating accelerations, via the control unit, that occur using data of at least one driver assistance system, and to activate the actuators in an anticipatory manner in response thereto.

15. The method according to claim 9, further comprising receiving user specifications in the control unit for activation of the actuators.

16. The method according to claim 9, wherein the actuators comprise electrical actuators.

17. A vehicle seat, comprising:
a plurality of actuators configured at least partially in a matrix formation and further configured to be activated independently of one another;
at least one sensor system for detecting an object on the vehicle seat; and
at least one control unit for activating the actuators, wherein the control unit is configured to estimate accelerations that occur using data of at least one driver assistance system, and to activate the actuators in an anticipatory manner in response thereto so that the contour of the vehicle seat adapts to the detected contour of the object,
and wherein the at least one control unit is further configured to activate some of the plurality of actuators to increase the rigidity of the vehicle seat in an area outside the contour to embed the object to the vehicle seat.

18. The vehicle seat according to claim 17, wherein the actuators are configured to set a rigidity of the vehicle seat.

19. The vehicle seat according to claim 17, wherein the vehicle seat is configured to include a reclined position.

20. The vehicle seat according to claim 17, wherein the sensor system for detecting an object is configured as (i) spatially distributed sensors in the vehicle seat and/or (ii) a passenger compartment monitoring sensor system of the vehicle.

* * * * *